United States Patent
Chapman

(10) Patent No.: US 11,788,839 B2
(45) Date of Patent: Oct. 17, 2023

(54) MAGNETIC COMPASS CARD

(71) Applicant: Paul Chapman, Tasmania (AU)

(72) Inventor: Paul Chapman, Tasmania (AU)

(*) Notice: Subject to any disclaimer, the term of this patent is extended or adjusted under 35 U.S.C. 154(b) by 0 days.

(21) Appl. No.: 17/625,901

(22) PCT Filed: Jul. 8, 2020

(86) PCT No.: PCT/AU2020/050711
§ 371 (c)(1),
(2) Date: Jan. 10, 2022

(87) PCT Pub. No.: WO2021/003530
PCT Pub. Date: Jan. 14, 2021

(65) Prior Publication Data
US 2022/0276051 A1     Sep. 1, 2022

(30) Foreign Application Priority Data

Jul. 10, 2019  (AU) .................. 2019902439

(51) Int. Cl.
*G01C 17/18*  (2006.01)

(52) U.S. Cl.
CPC .................. *G01C 17/18* (2013.01)

(58) Field of Classification Search
CPC ........ G01C 17/18; G01C 17/14; G01C 17/20; H01F 1/053; H01F 1/15325
See application file for complete search history.

(56) References Cited

U.S. PATENT DOCUMENTS

| | | | |
|---|---|---|---|
| 2,428,346 A | 9/1947 | Wilfrid | |
| 3,481,044 A | 12/1969 | Ogg | |
| 3,690,014 A | 9/1972 | Giltzow | |
| 3,833,901 A | 9/1974 | Fowler | |
| 4,357,756 A | 11/1982 | DeGaeta et al. | |
| 4,848,002 A * | 7/1989 | Carmona | G01C 17/08 33/364 |
| 4,930,224 A * | 6/1990 | LeBlanc | G01C 17/14 33/355 D |
| 6,105,265 A | 8/2000 | Gloor et al. | |
| 6,868,360 B1 * | 3/2005 | Olstad | G01C 17/18 702/92 |
| 8,528,220 B2 * | 9/2013 | Magosaki | G01C 19/38 33/324 |
| 9,080,869 B2 * | 7/2015 | Chapman | G01C 17/14 |

(Continued)

OTHER PUBLICATIONS

International Search Report for PCT/AU2020/050711, Prepared by the Australian Patent Office, dated Aug. 18, 2020, 5 pages.

*Primary Examiner* — Yaritza Guadalupe-Mccall
(74) *Attorney, Agent, or Firm* — BROOKS KUSHMAN PC; John E. Nemazi

(57) ABSTRACT

The balancing righting moments and dampening of the compass card and directive magnets in a liquid damped magnetic compass are separated to reduce the tilt and oscillation of the compass card when subjected to lateral acceleration, such as pitching and rolling in a seaway. The compass card is connected to the pivoted directive magnetic assembly by a card gimbal arrangement. The compass card is connected to the outer side of the gimbal ring rotating on a first axis. The magnetic assembly is connected to the inner side of the gimbal ring for rotation along a second axis oriented 90 degrees from the first axis.

11 Claims, 1 Drawing Sheet

(56) References Cited

U.S. PATENT DOCUMENTS

| | | | |
|---|---|---|---|
| 10,288,459 B2 * | 5/2019 | Chapman | G01D 11/28 |
| 2014/0182149 A1 * | 7/2014 | Chapman | G01C 17/14 |
| | | | 33/355 R |
| 2017/0284838 A1 * | 10/2017 | Chapman | G01D 11/28 |
| 2022/0276051 A1 * | 9/2022 | Chapman | G01C 17/18 |

* cited by examiner

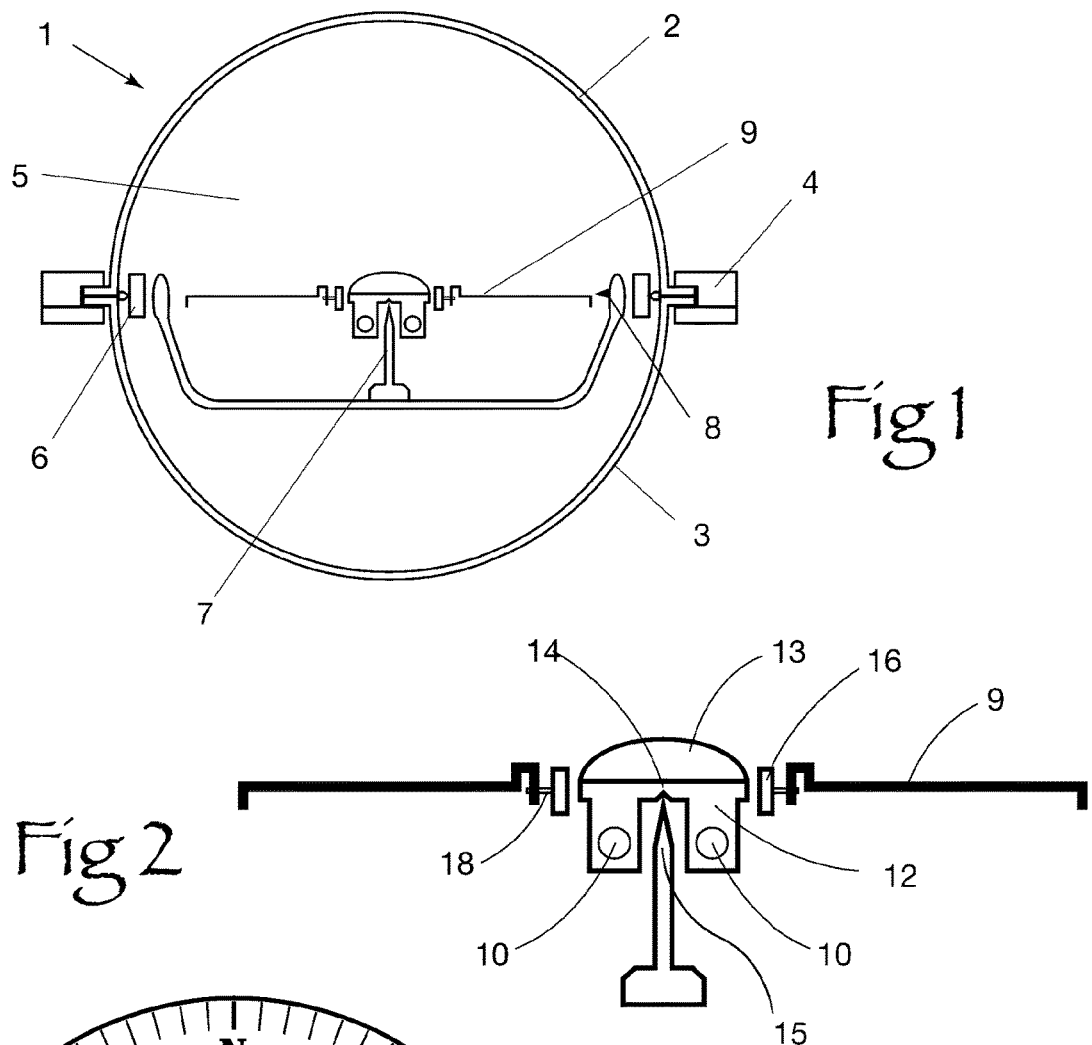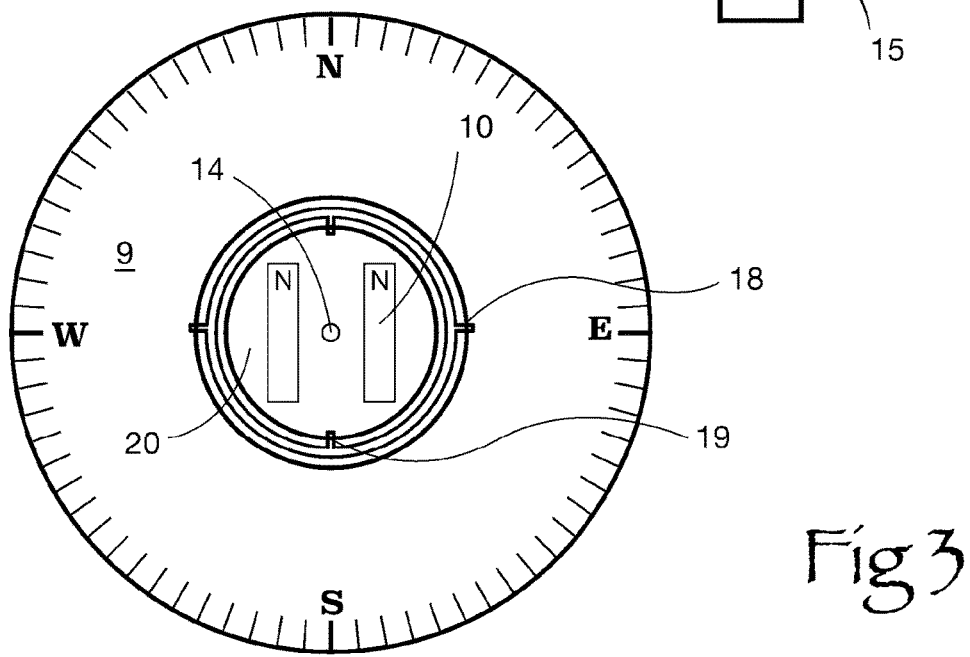

MAGNETIC COMPASS CARD

CROSS-REFERENCE TO RELATED APPLICATION

This application is the U.S. national phase of PCT Application No. PCT/AU2020/050711 filed on Jul. 8, 2020, which claims priority to AU Patent Application No. 2019902439 filed on Jul. 10, 2019, the disclosures of which are incorporated in their entirety by reference herein.

FIELD OF INVENTION

This invention relates to magnetic compasses that are used on marine vessels for indicating the orientation of the vessel relative to the Earth's magnetic field, in particular the invention relates to the card within a compass that can rotate about a pivot, the card displaying angular indicia such as the cardinal points of a compass and degree angles in between, while a marker fixed with respect to a housing for the compass points to a reading on the card representing the heading of a vessel.

BACKGROUND

Magnetic compass cards have one or more magnets attached thereto that are designed to align to the earth's horizontal magnetic field. A pivoted magnetic compass card and the directive magnet(s) attached to the card are kept level by the pendulous righting moment of mass and or buoyancy. In addition to the forces of gravity and buoyancy influencing the tilt of the card, the directive magnets are also subject to the tilting moment from the earth's vertical magnetic field. This effect of the earth's vertical magnetic field is conventionally addressed by;

having a large righting moment (to ensure the tilt of the card doesn't change by more than 3 degrees for a change in vertical field of 100 µT for a class A compass)
  weighting the north or south end of the card and limiting the operational region of the compass to different zones of vertical magnetic fields on the earth
  Allowing the directive magnets to tilt along the east-west axis of the card.

In all cases, when a compass experiences acceleration in an east-west direction, the compass card will tilt around the card's north-south axis, due to the pendulous righting moment. In the absence of damping, the angle of tilt is equal to a tan acceleration/g. With the card tilted around the north-south axis, the directive magnets will be influenced by the earth's vertical magnetic field, rotating the north end of the card in the direction of the acceleration where the earth's vertical magnetic field is upwards and away from the direction of acceleration where the earth's vertical magnetic field is downwards. The amount of rotation being equal to a tan (sin tilt×tan Magnetic Dip). This behaviour is well known in aircraft and is referred to as 'turning error' when the aircraft is experiencing centrifugal acceleration during a turn. On water-borne craft, significant accelerations can be experienced during pitching and rolling in a seaway. Oscillating accelerations in east-west directions can cause a compass card to oscillate, making it difficult for a helmsman to steer by or read a compass bearing.

The purpose of this invention is to reduce the oscillation of a liquid damped magnetic compass card when experiencing oscillating horizontal accelerations, such as those experienced by watercraft in a seaway, to produce a more stable directional reference from the magnetic compass.

DESCRIPTION OF INVENTION

The key to this invention resides in separating the righting moment and damping of the directive magnets from the righting moment and damping of the card. This is achieved by connecting the card to the directive magnets by a gimbal assembly. The gimbal arrangement has two orthogonal pivot axes with the directive magnets connected to the gimbal ring on a north-south axis and the compass card connected to the gimbal ring on an east-west axis.

The directive magnet assembly has a righting moment to keep the directive magnetic assembly substantially horizontal in the range of earth's vertical magnetic fields likely to be experienced or as required by ISO standards and is appropriately damped to avoid excessive movement. The righting moment is achieved either by having the centre of mass of the magnetic assembly below the pivot axes of the gimbals or by using buoyancy means. The compass card has a righting moment just sufficient to keep the card substantially level or as required by ISO standards and is appropriately damped with properties identified by Wilfred Gorden White outlined in his U.S. Pat. No. 2,428,346A.

Under acceleration in an east-west direction, the directive magnets assembly will tilt around the north-south axis, with the tilt away from horizontal, the earth's magnetic vertical field will rotate the directive magnets around the east-west axis, influencing the compass card along the plane of the compass card. With the smaller righting moment of the card and effective liquid damping, the tilt of the card will be substantially less than the directive magnets' assembly and less than a compass card with the directive magnets fixed. This improved stability is enhanced when the card is housed centrally in a liquid filled spherical bowl.

PREFERRED EMBODIMENT

The invention may be better understood with reference to the illustrations of a preferred embodiment of the invention in which:—

FIG. 1 shows a cross-section of a compass
  FIG. 2 shows a side view of the compass card with gimballed directive magnets viewed along the north-south axis.
  FIG. 3 shows a plan view of the compass card with gimballed directive magnets Referring to FIG. 1, a spherical compass bowl 1 comprises two hemispheres 2 and 3 held together by clamp rings 4. The hemispheres can be fabricated from injection-moulded polycarbonate or glass. A transparent dampening fluid such as Isopar L paraffin fills the void 5 within the bowl acting as a dampening agent for the components within the bowl. The clamp rings also provide a securing means to a vessel's ceiling, console, pedestal or bulkhead. Within the two hemispheres a set of major gimbal rings 6 support a pivot pin 7 and a pointer or lubber line 8. Resting on the pivot pin is a compass card assembly 9 which can be more clearly seen with reference to FIG. 2.

In FIG. 2, directive magnets 10 are attached to a plastic or aluminium housing 12 that holds the magnets. The directive magnets are of the rare-earth variety and are cylindrical with north-seeking ends. Typically they are 3-5 mm in diameter with a length of 20-40 mm. An optional flotation volume 13 assists in providing a righting moment and in lessening the load on the pivot pin. The housing has a central conical depression 14, also known as a jewel cap, to rest on a pivot pin 15. Alternatively the housing can include a pivot pin that rests on a jewel cap. The pivot pin and jewel cap are common components for compasses and do not form part of the invention. The housing 12 is kept level with the righting moment being achieved with the centre of mass being below the pivot point and or the centre of buoyancy being above the pivot point. The latter can be achieved by including on the magnet housing a buoyant or flotation chamber above the jewel cap.

The magnet housing supports a gimbal ring 16 that has internal swivel pins 19 aligned centrally along a north-south axis, while external pins 18 aligned along an east-west axis engage with a compass card 9. The compass card 9 is kept level with the righting moment of the card being achieved with centre of mass being below the external pins 18 and or the centre of buoyancy being above the external pins.

Referring to FIG. 3, these same components are shown along with the same corresponding numerical labels.

The above description is for illustration only and those skilled in the art of compass construction will find other methods to achieve the object of the invention while embodying the essence of the invention.

It will be appreciated from the above that the invention better separates the tilt of the magnet with that of the compass card, and thereby minimises unwanted compass card movements and oscillations as result of the lateral accelerations from rolling or pitching of a vessel.

The invention claimed is:

1. A magnetic compass comprising:
    a liquid filled spherical compass bowl,
    a compass card and magnetic assembly characterized by two sets of two axis gimbals, a first set coupling the bowl to a central vertical pivot on which the directive magnet assembly rests and can freely rotate and a second gimbal set coupling the directive magnet assembly to the compass card.

2. The magnetic compass as claimed in claim 1 in which the two-axis card gimbal comprises a gimbal ring with inner swivel pins coupled to a housing of the magnet assembly and outer swivel pins coupling the gimbal ring to the compass card.

3. The magnetic compass as claimed in claim 2 in which the outer side of the gimbal ring is coupled to the compass card rotating on a first axis while the magnetic assembly is connected to the inner side of the gimbal ring rotating along a second axis oriented 90 degrees from the first axis.

4. A magnetic compass comprising:
    a liquid filled spherical compass bowl,
    a compass card and magnetic assembly characterized by two sets of two axis gimbals, a first set coupling the bowl to a central vertical pivot on which the directive magnet assembly rests and can freely rotate and a second gimbal set coupling the directive magnet assembly to the compass card;
    wherein the magnet assembly comprises two parallel cylindrical rare-earth magnets straddling the pivot axis and having a centre of mass below a pivot point of the central pivot.

5. The magnetic compass as claimed in claim 4 in which the outer side of the gimbal ring is coupled to the compass card rotating on a first axis while the magnetic assembly is connected to the inner side of the gimbal ring rotating along a second axis oriented 90 degrees from the first axis.

6. A magnetic compass comprising:
    a liquid filled spherical compass bowl,
    a compass card and magnetic assembly characterized by two sets of two axis gimbals, a first set coupling the bowl to a central vertical pivot on which the directive magnet assembly rests and can freely rotate and a second gimbal set coupling the directive magnet assembly to the compass card;
    wherein the magnet assembly comprises two parallel cylindrical rare-earth magnets straddling the pivot axis and having a centre of mass below a pivot point of the central pivot.

7. The magnetic compass as claimed in claim 6 in which the outer side of the gimbal ring is coupled to the compass card rotating on a first axis while the magnetic assembly is connected to the inner side of the gimbal ring rotating along a second axis oriented 90 degrees from the first axis.

8. A magnetic compass comprising:
    a liquid filled spherical compass bowl, and
    a compass card and magnetic assembly characterized by two sets of two axis gimbals, a first set coupling the bowl to a central vertical pivot on which the directive magnet assembly rests and can freely rotate and a second gimbal set coupling the directive magnet assembly to the compass card;
    wherein the magnet assembly comprises two parallel cylindrical rare-earth magnets straddling the pivot axis and having a centre of mass below a pivot point of the central pivot.

9. The magnetic compass as claimed in claim 8 in which the outer side of the gimbal ring is coupled to the compass card rotating on a first axis while the magnetic assembly is connected to the inner side of the gimbal ring rotating along a second axis oriented 90 degrees from the first axis.

10. A magnetic compass comprising:
    a liquid filled spherical compass bowl, and
    a compass card and magnetic assembly characterized by two sets of two axis gimbals, a first set coupling the bowl to a central vertical pivot on which the directive magnet assembly rests and can freely rotate and a second gimbal set coupling the directive magnet assembly to the compass card;
    wherein the two-axis card gimbal comprises a gimbal ring with inner swivel pins coupled to a housing of the magnet assembly and outer swivel pins coupling the gimbal ring to the compass card;
    the two-axis card gimbal comprises a gimbal ring with inner swivel pins coupled to a housing of the magnet assembly and outer swivel pins coupling the gimbal ring to the compass card, and
    the magnet assembly comprises two parallel cylindrical rare-earth magnets straddling the pivot axis and having a centre of mass below a pivot point of the central pivot.

11. The magnetic compass as claimed in claim 10 in which the outer side of the gimbal ring is coupled to the compass card rotating on a first axis while the magnetic assembly is connected to the inner side of the gimbal ring rotating along a second axis oriented 90 degrees from the first axis.

* * * * *